W. S. GEDNEY.
TIRE VALVE CONTROL.
APPLICATION FILED DEC. 29, 1917.

1,275,416.

Patented Aug. 13, 1918.

William S Gedney
INVENTOR.

UNITED STATES PATENT OFFICE.

WILLIAM S. GEDNEY, OF BELLEVILLE, NEW JERSEY.

TIRE-VALVE CONTROL.

1,275,416.  Specification of Letters Patent.  Patented Aug. 13, 1918.

Application filed December 29, 1917. Serial No. 209,425.

*To all whom it may concern:*

Be it known that I, WILLIAM S. GEDNEY, a citizen of the United States, residing at Belleville, in the county of Essex and State of New Jersey, have invented certain Improvements in Tire-Valve Controls, of which the following is a specification.

With pneumatic tires, and particularly inner tubes of such tires, it often is desirable to exhaust the air completely therefrom. For instance, when a tube becomes punctured and a new one is substituted therefor, the punctured one is ordinarily folded and taken back for mending, but to fold it all the air must be exhausted. This does not occur normally, even with a puncture or with the filling valve held open, until pressure is applied to the tube progressively toward the valve, as by rolling the tube in a tight bundle toward the valve. It will be appreciated that at the same time the tube is rolled, the filling valve has to be held open, which is inconvenient for one person to do at the same time of rolling the tube.

My invention has for its primary object to provide means for holding the filling valve of a tire open and thereby permit the air to be exhausted therefrom without continuous attention.

The invention contemplates further the accomplishment of this end by means which can be left upon and remain part of the valve structure without operating to hold the valve open unless so desired.

Other objects are to obtain a simple, efficient and inexpensive structure, readily applied and operated, together with such other objects as may be brought out in the following specification.

Referring to the accompanying drawings in which same parts are designated throughout the several views by corresponding characters of reference, Figure 1 is a side elevation of one end of a filling valve to which my invention has been applied;

Figure 1:
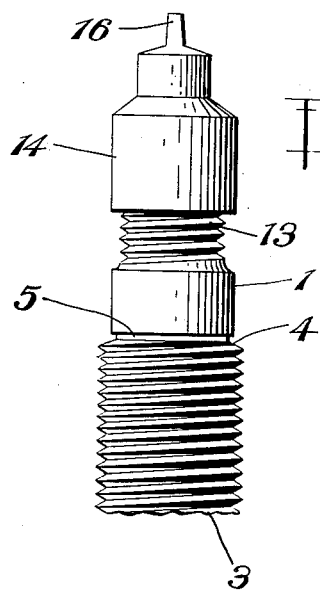

In the physical embodiment of the invention disclosed for illustrative purposes in said drawings, the reference numeral —1— indicates a nipple or sleeve of appropriate length and diameter, which has its interior bore screw threaded, as at —2—, preferably the entire length of said nipple. The character of these threads —2— is such that the nipple may be screwed upon the cap or free end of a filling valve —3— such as are in common use upon pneumatic tires, and displace, as shown, the usual cap employed upon such filling valves. It may here be noted, that filling valves ordinarily have their outer ends reduced and threaded for receiving such caps, and their inner ends, or ends toward the tire, also threaded to receive a larger protecting hood, not shown, to cover the entire valve, an outwardly facing shoulder —4— being provided between the inner and outer threaded portions of said filling valve. The sleeve or nipple —1— is of such proportions as to screw upon the reduced outer end of the filling valve without interfering with passing the hood down over it and screwing such hood upon the inner end of the filling valve. Between the inner end of the nipple —1— and the shoulder —4—, I preferably insert a washer —5— so as to obtain a tight joint, the end of said nipple preferably having an annular recess —6— for receiving and holding said washer.

By reference to the drawing, it will be seen that the nipple is of such length that its outer end projects beyond the end of the filling valve, and within this outer portion of the nipple is a cylindrical rider —7— screw threaded, as at —8—, to coöperate with the threads —2— upon the inside of the nipple, thereby permitting said rider to be screwed in or out as desired. It is to be understood, however, that the projecting portion of the nipple beyond the filling valve is long enough and the cylindrical rider is short enough that said rider may be positioned out of engagement with the usual valve stem —9— and still be within the nipple. The rider is furthermore so formed longitudinally as to permit air to pass from one end to the other in either filling or emptying the tire, and as shown, this is obtained by a plurality of longitudinal grooves —10— in the periphery of the rider, although this might be otherwise if desired.

At its end toward the filling valve, the rider preferably is provided with a reduced neck —11— adapted to enter the end of the filling valve, where required, without closing the same to passage of air, and engage the valve stem —9— should said stem be short and not project beyond the end of the filling valve. This neck —11— is, however, of sufficient diameter to normally engage the valve stem even though the latter be not exactly at the center of the filling valve. In order to avoid any tendency for the stem to slide off the edge of the neck and become wedged against the side of the filling valve, I preferably hollow the end of said neck, that is, make it concave so the normal tendency of the stem when engaged by the end of said neck will be to stand centrally within the filling valve.

The opposite end of the rider —7— from the neck —11— preferably has a transverse slot or saw-slit —12— in which a tool, such as a screw-driver, may be inserted for rotating the rider and screwing it into or out of engagement with the valve stem, although other means for applying a tool may be provided if desired.

The nipple —1— is preferably also exteriorly screw threaded, as at —13—, adjacent its outer end for receiving a cap —14— thereupon. I have shown within this cap —14— a washer —15—, which, coöperates with the washer —5— at the other end of the nipple to prevent escape of air should the valve mechanism leak. The outer end of this cap is preferably shaped to provide a blade —16— like the end of a screw-driver, which may be employed to operate the rider. For greater utility in this respect the cap is of an exterior diameter adjacent the blade small enough to enter the outer end of the nipple.

Figure 2:
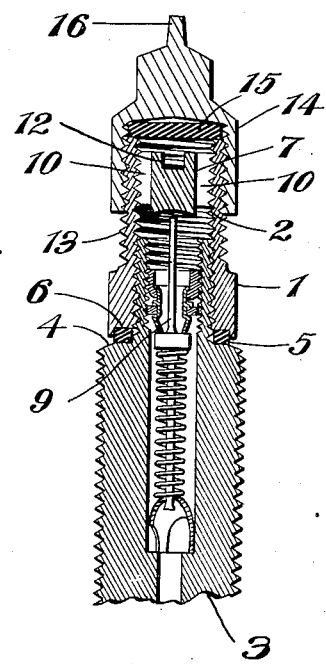
Fig. 2 is a longitudinal section of the same, showing the parts with the valve closed.
Figure 3:
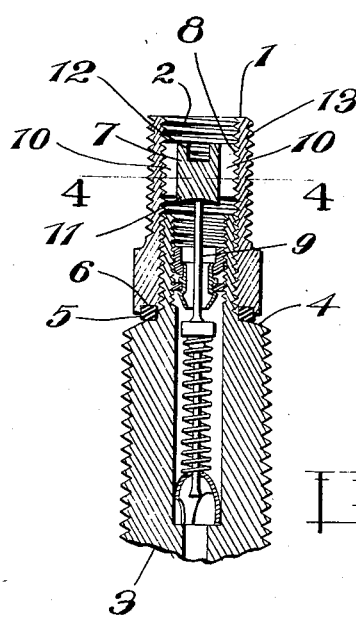
Fig. 3 is a similar view with the cap removed and the rider screwed down for holding the valve open.
Figure 5:
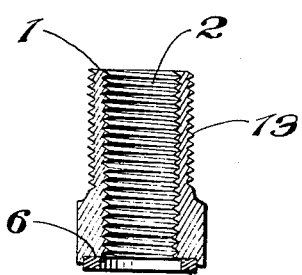
Fig. 5 is a longitudinal section of the nipple alone.
Figure 4:
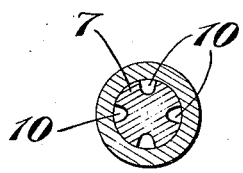
Fig. 4 is a cross section on line 4—4 of Fig. 3.
Figure 6:
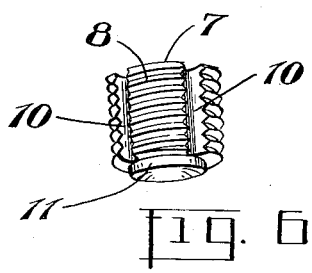
Fig. 6 is a perspective view of the rider alone.

In use, preferably each tire will be provided with one of my improved control means which will be left upon the valves at all times, but it is within the scope of the invention to employ one of my devices temporarily upon a valve and remove it when the air is exhausted, or in fact to employ it in any manner desired. When the device is left upon the valve at all times, the nipple is screwed down tight so as to seat upon the washer —5— with an impervious joint, and the cap —14— will then completely prevent escape of air when screwed down tight should the valve mechanism leak. The rider —7— is ordinarily positioned at the outer end of the nipple —1—, as shown in Fig. 2, out of engagement with the valve stem —9— so as not to open the valve. When it is desired to exhaust the air from the tire the cap —14— is removed and with a suitable tool, such as the end or blade —16— of the cap, provided for the purpose, the rider is screwed down until its end engages and depresses the valve stem, thus opening the valve mechanism and permitting the air to be exhausted from the tire. Before pumping up the tire again the rider is returned adjacent the outer end of the nipple out of engagement with the valve stem.

While I have shown my invention applied to a filling valve of usual construction, it is to be understood that an entire valve may be manufactured including the nipple shown herein as an integral part therewith, and, in fact, various other variations from the present disclosure may be made without departing from the spirit and scope of the invention as more particularly pointed out in the appended claims which are to be construed in the light of the prior art.

Having thus described my invention, what I claim is,

1. The combination with a sleeve-like member having interior and exterior screw threads and a valve stem extending longitudinally of said sleeve, of a rider having threads to coöperate with said interior threads of the sleeve thereby adapted to be screwed against said valve stem for opening the same so as to deflate the tire, one of said threaded parts having a longitudinal passage for the flow of air from end to end of said rider, said rider remaining within said sleeve both during inflation and deflation of the tire, and said exterior threads of the sleeve adapted to receive either an inflating tube or a cap independent of the rider.

2. A device of the character described comprising a nipple having interior screw threads for attaching the nipple to a valve, a rider within said nipple having threads adapted to coöperate with said threads of the nipple for moving said rider longitudinally and having a passage for air permitting flow of air from one end to the other thereof, said rider remaining within the nipple during both inflation and deflation of the tire, and means for applying either a cap or inflating tube to the exterior of said nipple independent of the rider, whereby said nipple may remain permanently upon the valve and the rider within the nipple.

WILLIAM S. GEDNEY.